United States Patent [19]

Corney

[11] Patent Number: 5,178,757

[45] Date of Patent: Jan. 12, 1993

[54] MAGNETIC, FLUID-CONDITIONING TOOLS
[75] Inventor: John D. Corney, McAllen, Tex.
[73] Assignee: Mag-Well, Inc., Dallas, Tex.
[21] Appl. No.: 811,840
[22] Filed: Dec. 20, 1991

Related U.S. Application Data

[63] Continuation of Ser. No. 546,254, Jun. 29, 1990, abandoned.

[51] Int. Cl.⁵ .............................................. B01D 1/48
[52] U.S. Cl. .................................... 210/222; 210/695; 55/100
[58] Field of Search .................... 210/222, 223, 695; 55/100; 123/536, 538; 166/665, 304

[56]     References Cited
U.S. PATENT DOCUMENTS

| | | | |
|---|---|---|---|
| 4,110,222 | 8/1978 | Watson | 210/222 |
| 4,390,423 | 6/1983 | Sundt | 210/222 |
| 4,414,951 | 11/1983 | Saneto | 210/222 |
| 4,564,448 | 1/1986 | O'Meara, Jr. | 210/222 |
| 4,834,870 | 5/1989 | Osterberg et al. | 209/38 |
| 5,024,271 | 6/1991 | Meihua | 210/222 |
| 5,052,491 | 10/1991 | Harms et al. | 210/222 |

FOREIGN PATENT DOCUMENTS 189991 10/1984 Japan ................................. 210/222

Primary Examiner—Robert A. Dawson
Assistant Examiner—Matthew O. Savage
Attorney, Agent, or Firm—John M. Cone; William L. Clayborn

[57]      ABSTRACT

A magnetic tool for conditioning fluids includes a hollow core providing at least one passage through which the fluid to be treated flows. An array of magnets extends longitudinally along the core with the poles of the magnets arranged to provide a magnetic field perpendicular to the flow path to enhance the magnetic conditioning effect of the tool. The magnets are formed of a rare earth magnetic material, such as neodymium-iron-boron, and are backed by a flux-carrying member of cobalt-iron-alloy, with rounded corners to reduce loss of a magnetic field. Each magnet is mounted at least partially within an outer surface of the core with the flux-carrying member contacting, covering, and extending between the outer major faces of the magnets.

9 Claims, 3 Drawing Sheets

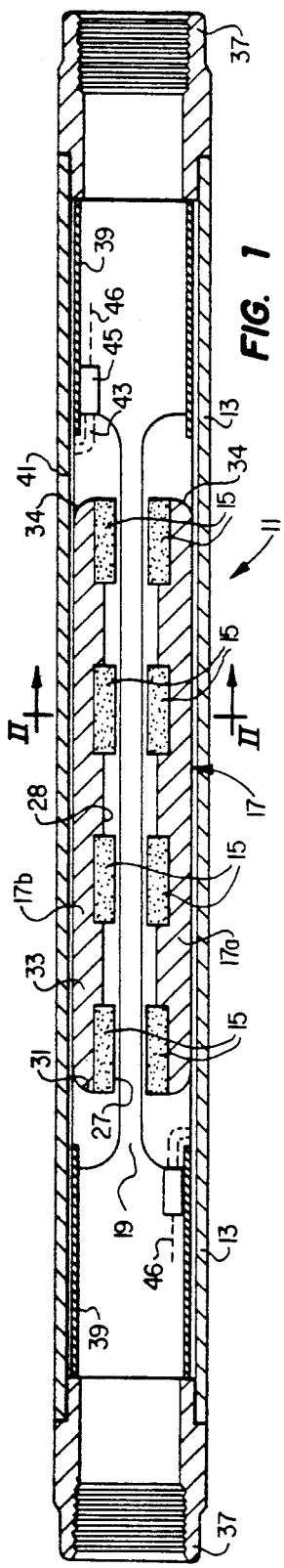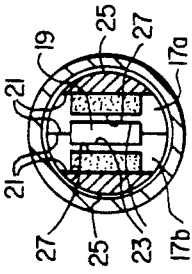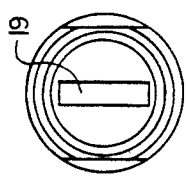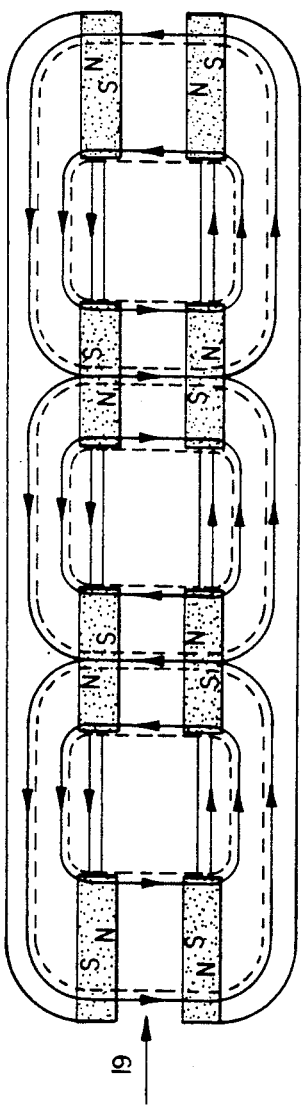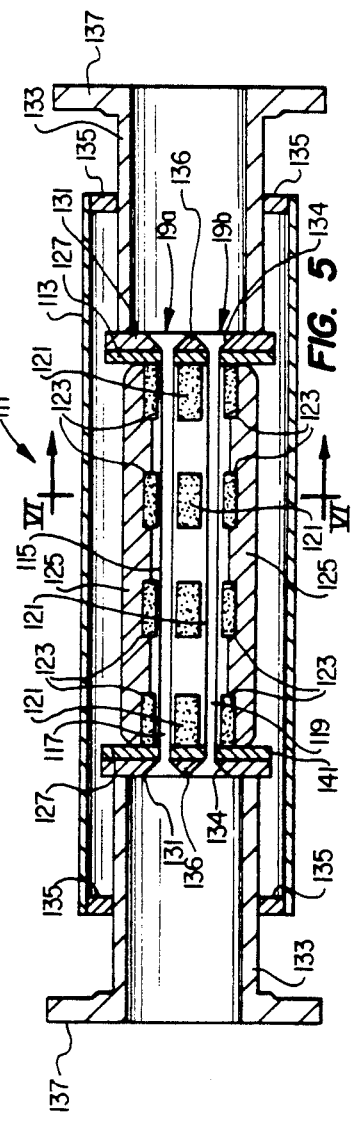

MAGNETIC, FLUID-CONDITIONING TOOLS

This is a continuation of application Ser. No. 07/546,254, filed Jun. 29, 1990, now abandoned.

FIELD OF THE INVENTION

The present invention relates to tools for exposing a fluid to a magnetic field to cause a change in solids carried in or precipitated from that fluid. Such tools are known in the field of water treatment for the purpose of changing the crystalline state of calcium carbonate, iron, magnesium, strontium, barium and diamagnetic scale-forming materials to reduce the likelihood of hard scale formation on the walls of pipes or tubes through which the water passes. In addition, in oil wells, where oil is frequently found mixed with water, magnetic conditioning has been used both on the water phase, to prevent scale formation, and on the oil phase, to prevent clogging by the deposition of hydrocarbon solids, such as paraffin wax, asphaltic material and combinations thereof. In addition, magnetic conditioning can reduce the likelihood of water and oil molecules combining.

BACKGROUND AND PRIOR ART

Some prior art magnetic tools have consisted of little more than means for suspending magnets around a piping system through which the fluid passes. Sample of this form of magnetic fluid conditioning tools are those described in the product literature of Aqua Magnetics, Inc., entitled "Aqua Magnetics Power Units."

U.S. Pat. No. 4,564,448 (O'Meara) disclosed a magnetic fluid treatment tool comprising a hollow, cylinder in which are housed a central magnetic assembly and one or more concentric ring magnetic assemblies. Another passageway between the core magnet assembly and the ring magnet assembly provided fluid flow paths through the tool.

U.S. Pat. No. 4,532,040 (Meeks et al) disclosed a magnetic fluid treatment tool comprising a tubular outer housing within which are mounted inner and outer concentrically arranged annular arrays of cylinderical magnets. A cylinderical inner casing surrounds the inner array of magnets and a cylinderical outer casing is disposed inside the outer array of magnets so that an annular fluid flow passage is defined between the inner and outer casings.

OBJECTS OF THE INVENTION

It is an object of this invention to provide a tool with enhanced field strength, allowing high velocity of fluid flow, but with low pressure drop through the tool.

It is a further object to provide a tool where the magnetic fields are arranged to have a maximum effect on fluid passing through the tool by arranging for the magnetic intersects to be close packed, while still avoiding magnetic flux leakage. This is achieved using a flux path that is perpendicular to the fluid flow and arranging to avoid limb leakage or flux leakage from the magnetic circuit by ensuring that the magnetic lines of force are directed almost entirely across a fluid flow path through the tool, by providing a flux return member backing the magnets and by avoiding sharp turns or corners in the flux path.

It is a further object to provide a tool which can operate at the high pressures commonly experienced down hole. This is achieved by a pressure equalization chamber within the tool.

It is a yet further object of the invention to overcome the problem associated with some known tools in which ferromagnetic products of corrosion become adhered to the magnets or other surfaces of the tool. To provide self-cleaning, tools embodying the invention have a thickness of non-magnetic material between the magnets and the fluid. This material, together with the relatively high fluid flow velocity possible with these tools, substantially prevents adherence of corrosion products. Accordingly, the present invention provides a tool that is substantially self-cleaning.

SUMMARY OF THE INVENTION

According to the present invention, there is provided an elongate core; at least one air gap passage extending longitudinally through the core; at least two longitudinally extending arrays of magnets mounted on exterior surfaces of the core on opposite sides of the air gap passage, the magnets in each array being in register across the air gap passage; each magnet being in the shape of a relatively flat, elongate, rectangular bar with one of its major faces against the core and with the magnetic poles of the magnet in the major faces of the magnet with each registered pair of magnets having opposed poles adjacent to provide a magnetic field substantially perpendicular to the passage; flux carrying means covering the outer face of the magnets and the core to provide a return path for the magnetic flux.

The prior art constructions produce a magnetic field across the fluid flow passage which is perpendicular to the flow passage for only a relatively short length. In the present invention, the effectiveness of the magnetic field is enhanced because the arrangement of magnets increases the duration of exposure time of the fluid to magnetic fields substantially perpendicular to the flow direction.

BRIEF DESCRIPTION OF THE DRAWINGS:

The invention will now be described by way of example only with reference to the accompanying drawings in which.

FIG. 1 is a longitudinal cross-section through a down-hole, magnetic, fluid treatment tool embodying the invention;

FIG. 2 is a transverse cross-section on the line II—II in FIG. 1;

FIG. 3 is an end view of the tool shown in FIG. 1;

FIG. 4 is a schematic representation showing the arrangement of the magnetic lines of force in the tool shown in FIG. 1; and FIG. 5 is a longitudinal cross-section though an alternative form of magnetic, fluid treatment tool embodying the invention.

DETAILED DESCRIPTION OF PREFERRED EMBODIMENTS

Figure 6:
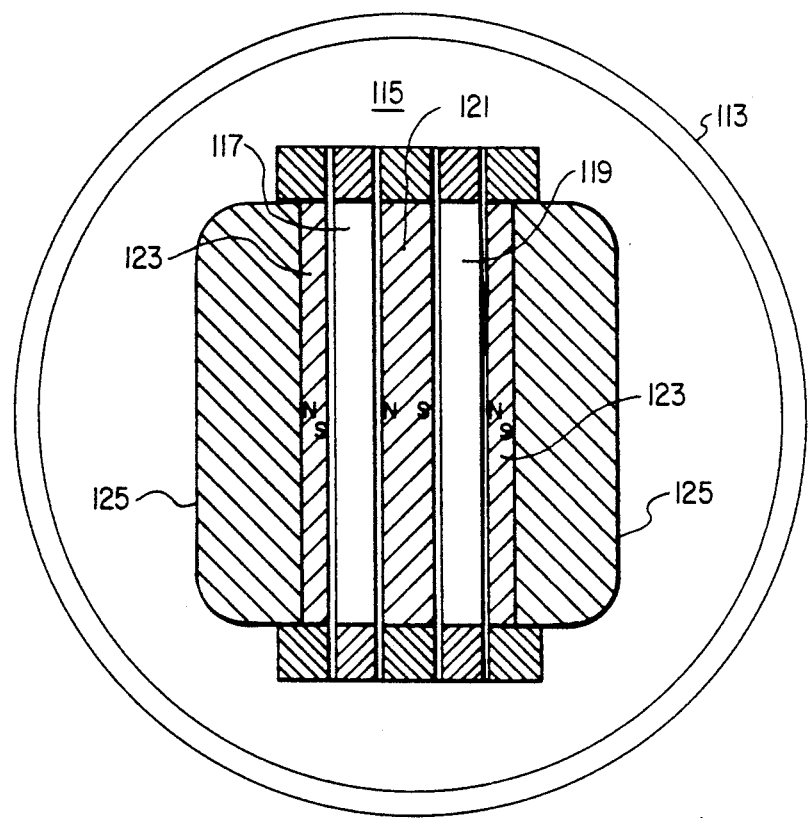
FIG. 6 is a section on the line VI—VI in FIG. 5.

Referring to the preferred embodiment of the invention shown in FIGS. 1-4, and as best seen in FIG. 1, the tool 11 comprises a hollow tube 13 containing an array of eight magnets 15, disposed in four longitudinally spaced apart pairs and mounted on a two part core assembly 17, which provides an axially extending air gap or fluid flow passage 19 along the axis of the tube 13 through which the fluid to be conditioned passes. The magnets 15 are flat, elongate rectangular bars having greater length and width than depth, and are positioned so that their major faces extend substantially parallel to the passage 19, as shown in FIG. 1. As shown, the magnets 15 of each pair are disposed with their opposed magnetic poles adjacent to the air gap 12 to form a magnetic field directly across the air gap (See FIG. 4). The magnets 15 are preferably of neodymium-iron-boron, or samarium cobalt, or other known rare earth magnetic materials which can be magnetized to produce poles in the major faces, and not at the longitudinal ends, of flat rectangular shaped magnets.

The core assembly 17 comprises two identical parts 17a and 17b of, a non-magnetic material for example, 316 stainless steel. Each core assembly part 17a or 17b is of a generally semi-cylindrical shape having in the center of its planar, inner face 21 an open channel 23 of rectangular cross-section which extends the length of the face 21. The two parts 17a and 17b are secured together, as by welding, with their inner faces 21 in contact to provide, by cooperation of the channels 23, the fluid flow passage, or air gap, 19.

An outer, curved face 25 of each of the parts 17a, 17b has two flat, recessed, magnet-receiving surfaces 27, separated by a raised land 28. The axially outer ends of the semi-cylindrical outer surface 25 are intact, providing end faces 31 for the core parts 17a and 17b and abutments helping to locate the magnets 15 in place on the assemblies 17a, 17b. The magnets 15 are mounted at least partially within the outer surface of the case 17 as shown in FIGS. 1 or 2.

A flux-coupling cover member 33 of low reluctance material is mounted on each part 17a, 17b. The cover members 33 are preferably formed of cold drawn steel, or a cobalt alloy. They cover the magnets 15 and are shaped to complement the parts 17a, 17b and to form therewith a semi-cylindrical shape. The ends of the cover members 33 are rounded as at 34 to reduce magnetic flux loss. The cover members 33 serve as a path for the return lines of magnetic force of the magnets 15, as shown schematically in FIG. 4.

The core assembly 17 magnets 15 and cover members 33 are housed within the tube 13 of, for example, 316 stainless steel, which forms an outer, cylindrical casing for the tool 11. The ends of the tube 13 are provided with coupling members 37, which may be of a number of different designs well known to those skilled in the art. The coupling members 37 enable the tool 11 to be connected into production pipe for down hole use.

A stainless steel tube 39 is connected between the inner end of the coupling member 37 and the outer end of the adjacent core assembly 17 to locate the assembly 17 in position in the tube 13.

A sealed space 41 is provided between the outer surface of the flux cover member 33 and the inner surface of the tube 13 to form a pressure equalization chamber. Access to the chamber 41 is provided by a passage 43 through one end of the core assembly 17. The passage 43 is usually closed, as by check valves 45 at each end. The space 41 may be filled with oil that can be placed under pressure to protect the tool "against damage when used down-hole under pressure. For this purpose, oil lines 46 (shown schematically in FIG. 1) are connected to the two check valves 45 and to a source of oil under pressure (not shown). Thus, if the tool 11 is under pressure down-hole, oil will vent through the check valves 45 to relieve the tool 11 when it is raised to the surface. The check valves 45 can be set to work at specific pressures, thus ensuring some pressure in the space 41 at all times. The oil in the space 41 also protects the magnets 15 from corroding.

The check valves 45 are, of course, optional. In another embodiment of the invention, the chamber 41 is filled with hydraulic fluid and sealed. It is not possible in that alternative embodiment to vary the pressure of the oil in the chamber 41, but that oil, nevertheless, provides some protection for the magnets.

Figure 7:
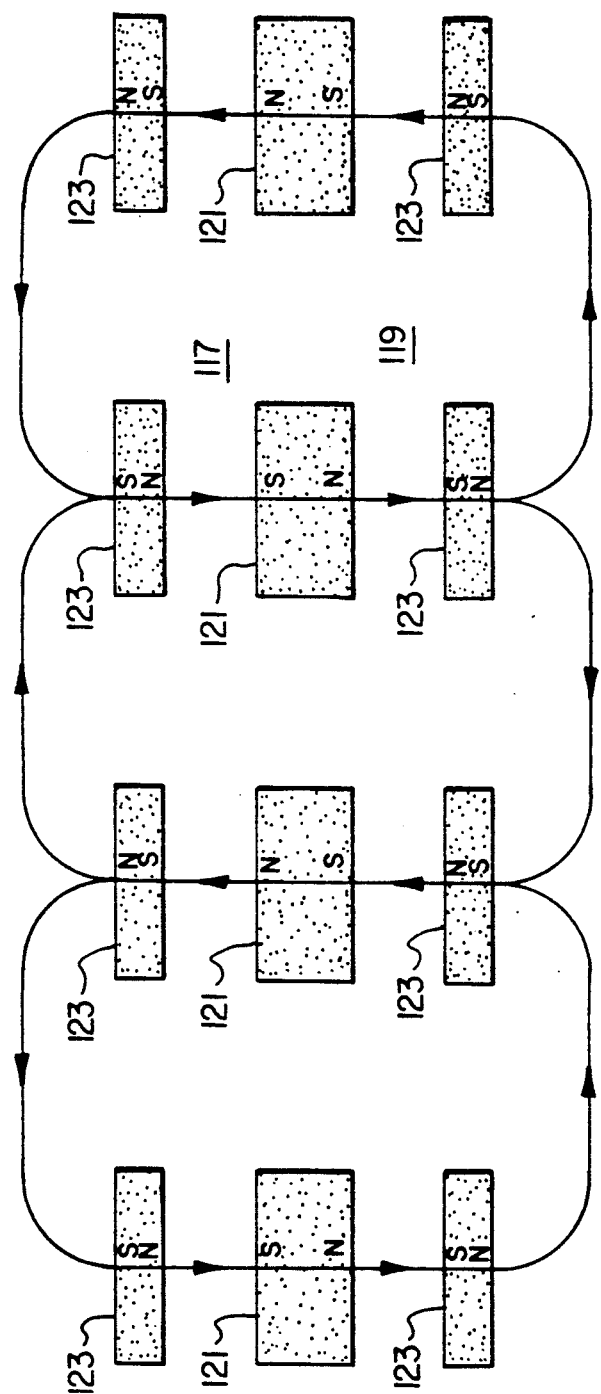
FIG. 7 is a diagram showing the magnetic lines of force in the tool shown in FIG. 5.

FIGS. 5–7 show an alternative form of magnetic tool 111, more suited, because of its greater diameter, to surface uses. As is readily apparent from FIG. 5, the major difference between the tool shown in FIG. 1 and that shown in FIG. 5 is that in the latter an extra set of magnets is mounted along the axis of the tool 111, dividing the air gap or passage into two passages. Pairs of magnets provide a magnetic field across each of the air gaps through which the fluid to be treated passes.

The tool 111 comprises a hollow outer case 113 of mild or stainless steel. The outer case 113 is shown as having a circular cross-section, though it could, of course, be of rectangular cross-section. Within the outer case 113 is housed the magnet assembly comprising a core 115 of a non-magnetic material, example, stainless steel through which extend two rectangular slots that provide two parallel air gaps 117, 119. The core 115 at its center between the air gaps 117, 119 houses a central array of relatively flat, rectangular magnets 121, spaced longitudinally along the axis of the tube, with the polarities of adjacent magnets reversed, as seen in FIG. 5. The core 115 is conveniently formed from a bar of stainless steel, which is cut in half axially to expose a flat surface. This surface is excavated to provide "beds" for the magnets 121. After the magnets 121 are in place, the two halves are secured back together.

The two outer surfaces of the body 115 are adapted to house two further aligned arrays of relatively flat, rectangular magnets 123 which are in register with each other and with the magnets 121 in the central array. The magnets 123 are arranged so that each presents an opposite pole to the pole of the adjacent face of the corresponding central magnet 121, as seen in FIG. 5.

The magnets 123 are covered by magnetic flux return members 125 of cold drawn steel, or cobalt alloy. The outer edges of the return members 125 are rounded to reduce magnetic flux leakage.

As best seen in FIG. 5, each end of the body 115 is secured to an end ring member 127, which is, in turn, secured to an annular flange 131 mounted on the inner end of a stainless steel pipe 133 which extends into the casing 113 and is secured therein by inwardly extending flanges 135 on the casing 113. The outer face of each flange 131 is tapered inwardly, as at 134, to aid the smooth flow of fluid into the air gap passages 117, 119. Similarly, the outer end of the central portion of the body 115 is covered by a conical face member 136 to aid smoothness of fluid flow into the air gap passages. The outer ends of the pipe 133 are provided with flange coupling members 137 for connecting the tool 111 into, say, production pipe.

Figure 6A:
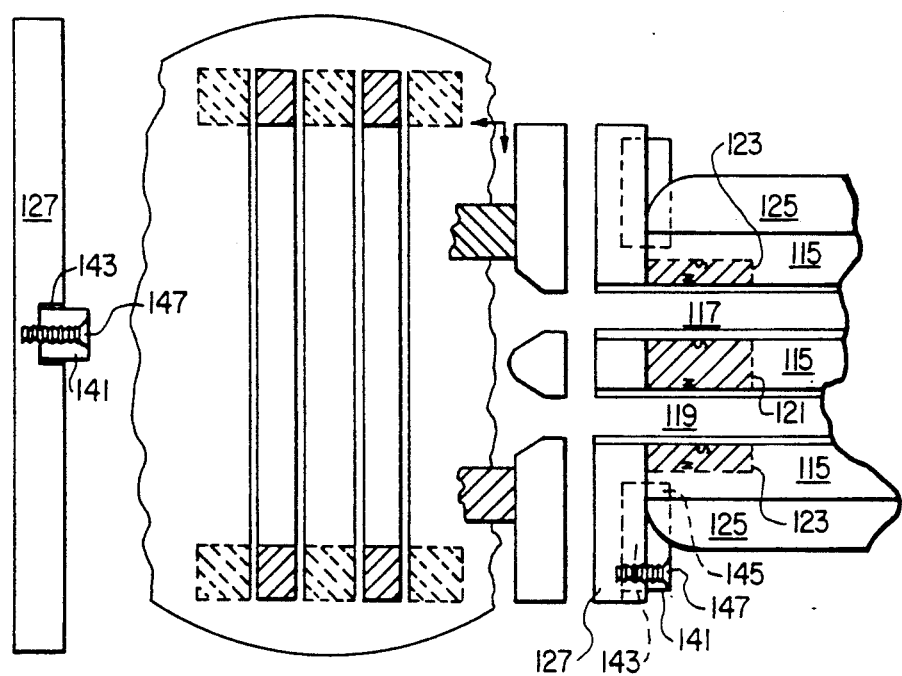
FIG. 6A includes three detailed views of the tool shown in FIG. 5.

Rectangular keys 141 secure the flux return members 125 on the body 115, as best seen in FIG. 6A. In FIG. 5, the flux return members 125 are shown secured by keys 141 at one end only. It will be appreciated that both ends could be similarly secured. The keys 141 are housed in slots 143, 145 formed in the end ring members 127 and in the outer surface of the flux return member 125 respectively. Once the keys 141 are inserted into the sets, they are secured there, as by screw fasteners 147 extending into the end ring member 127.

FIG. 7 shows the magnetic field created by the tool shown in FIGS. 5-6.

I claim:

1. A tool for the magnetic treatment of fluids comprising:

a housing having an inlet and an outlet for connecting the tool in a fluid pipeline, said housing having a longitudinal axis;

an elongate core of non-magnetic material mounted within said housing;

at least one air gap passage extending parallel to or along said longitudinal axis through the core and providing a fluid-transmission path between said inlet and outlet and defining an inner surface;

at least two arrays of magnets, each said array of magnets being parallel to said longitudinal axis, each magnet being mounted at least partially within an outer surface of said core, said arrays of magnets being located on opposite sides of the air gap passage, each magnet in one array being in register with an opposing magnet in an array on the opposite side of the air gap passage;

adjacent magnets in each array being spaced apart with their poles reversed with respect to each other and with respect to the opposing registered magnet in the array on the opposite side of the air gap passage to provide a series of magnetic fields that are substantially perpendicular to the air gap passage with the direction of each such field being opposite that of the field or fields adjacent thereto;

each magnet being in the shape of a flat elongate bar of rectangular cross-section having an inner major face that is disposed toward the air gap passage and an outer major face that is disposed toward the housing, the magnetic poles of each magnet being located in the major faces of the magnet and the inner major face of the magnet being positioned against the core adjacent to the air gap passage; and at least two flux-carrying means, each flux carrying means contacting, covering, and extending between the outer major faces of the magnets of a respective said array of magnets to provide a return path for the magnetic flux, said flux-carrying means having rounded ends to reduce magnetic flux leakage.

2. A tool according to claim 1 wherein the core is of stainless steel.

3. A tool according to claim 1 wherein the flux carrying means is formed of cobalt-iron-alloy.

4. A tool according to claim 1 wherein the magnets are formed of rare earth magnetic material.

5. A tool according to claim 4 wherein the rare earth magnetic material is neodymium-iron-boron.

6. A tool according to claim 1 wherein the core and the flux-carrying means have exterior surfaces that are adjacent to the housing and wherein an annular space is provided between said exterior surfaces and the housing and means are provided for pressurizing and depressurizing the annular space.

7. A tool according to claim 1 wherein the core has a second air gap passage therethrough and in which a further longitudinally extending array of magnets is accommodated within the core between the two air gap passages.

8. A tool according to claim 1 wherein the housing is of stainless steel.

9. A tool according to claim 1 wherein the core and the flux-carrying means have exterior surfaces that are adjacent to the housing and wherein a sealed annular space is provided between said exterior surfaces and housing, which annular space is filled with an incompressible liquid.

* * * * *